US012807848B2

(12) United States Patent
Ternorusky et al.

(10) Patent No.: US 12,807,848 B2
(45) Date of Patent: Nov. 24, 2026

(54) WATER-DISPERSIBLE PRESSURE SENSITIVE ADHESIVE COMPOSITION

(71) Applicant: Arkema France, Colombes (FR)

(72) Inventors: Leo Ternorusky, Dublin, OH (US); Lauren Alexander, Dublin, OH (US); David Mountz, Dublin, OH (US); Nathan Ramsey, Dublin, OH (US)

(73) Assignee: Arkema France, Puteaux (FR)

( * ) Notice: Subject to any disclaimer, the term of this patent is extended or adjusted under 35 U.S.C. 154(b) by 789 days.

(21) Appl. No.: 18/265,442

(22) PCT Filed: Nov. 23, 2021

(86) PCT No.: PCT/US2021/060469
§ 371 (c)(1),
(2) Date: Jun. 6, 2023

(87) PCT Pub. No.: WO2022/109444
PCT Pub. Date: May 27, 2022

(65) Prior Publication Data

US 2024/0026192 A1 Jan. 25, 2024

Related U.S. Application Data

(60) Provisional application No. 63/117,299, filed on Nov. 23, 2020.

(51) Int. Cl.

| | |
|---|---|
| ***C08L 33/06*** | (2006.01) |
| ***C08K 5/00*** | (2006.01) |
| ***C09J 7/38*** | (2018.01) |
| ***C09J 133/06*** | (2006.01) |

(52) U.S. Cl.
CPC ........... *C09J 133/06* (2013.01); *C08K 5/0008* (2013.01); *C08L 33/06* (2013.01); *C09J 7/38* (2018.01); *C08K 2201/014* (2013.01); *C08K 2201/019* (2013.01); *C08L 2201/52* (2013.01); *C09J 2203/334* (2013.01); *C09J 2301/302* (2020.08); *C09J 2301/312* (2020.08); *C09J 2301/408* (2020.08)

(58) Field of Classification Search
CPC ...... C09J 133/06; C09J 7/38; C09J 2301/312; C09J 2301/408; C09J 2301/302; C09J 2203/334; C08K 2201/014; C08K 2201/019; C08K 5/0008; C08L 33/06; C08L 2201/52
USPC .......................................................... 524/522
See application file for complete search history.

(56) References Cited

U.S. PATENT DOCUMENTS

| | | | |
|---|---|---|---|
| 9,422,465 B2 | 8/2016 | Mueller et al. | |
| 9,546,305 B2 | 1/2017 | Hammond et al. | |
| 10,526,480 B2 | 1/2020 | Ternorutsky et al. | |
| 2004/0054063 A1 * | 3/2004 | Brown | C08K 9/08 428/402 |
| 2010/0080763 A1 * | 4/2010 | Kantner | A61K 8/8147 424/59 |
| 2014/0308516 A1 | 10/2014 | Yonezaki et al. | |
| 2018/0134888 A1 | 5/2018 | Ternorutsky et al. | |

FOREIGN PATENT DOCUMENTS

| | | | |
|---|---|---|---|
| CN | 104004477 A | 8/2014 | |
| CN | 109266256 A | 1/2019 | |
| RU | 2007147123 A * | 6/2009 | C09J 133/02 |

* cited by examiner

*Primary Examiner* — Kelechi C Egwim
(74) *Attorney, Agent, or Firm* — Christopher R. Lewis

(57) ABSTRACT

A plurality of multiphase polymer particles comprising an acrylic-based copolymer derived from monomers comprising: an alkyl methacrylate; an alkyl acrylate; a hydroxyalkyl acrylate or hydroxyalkyl methacrylate; at least one acid; a carboxyalkyl (meth)acrylate; a vinyl ester, and at least one co-polymerizable surfactant. Also disclosed is an emulsion comprising: a plurality of multiphase polymer particles comprising an acrylic-based copolymer, at least one co-polymerizable surfactant, at least one alkylphenol ethoxylate (APE) free nonionic surfactant, and at least one APE free anionic surfactant in an aqueous medium in presence of a free-radical initiator and a buffer. Another objective of this application discloses a water-dispersible acrylic pressure sensitive adhesive composition for label applications, a process for the preparation thereof and a method of bonding a label to a container with the composition.

26 Claims, No Drawings

WATER-DISPERSIBLE PRESSURE SENSITIVE ADHESIVE COMPOSITION

This application claims priority to PCT/US2021/060469 filed Nov. 23, 2021, which claims priority to U.S. Application Ser. No. 63/117,299 filed Nov. 23, 2020.

FIELD OF THE INVENTION

The presently disclosed process(es), procedure(s), method (s), product(s), result(s) and/or concept(s) (collectively referred to hereinafter as the "present disclosure or invention") relates generally to a water-dispersible pressure sensitive adhesive composition for label applications, a method of bonding a label with the composition, a method of preparing the composition thereof.

BACKGROUND OF THE INVENTION

The present invention relates to a water-dispersible pressure sensitive adhesive composition for bonding a label to a container, a process of preparing the composition and a method of bonding a label to a container with the composition.

The general practice, glass or polymer containers and bottles are used for storing different type of FMCG liquids such as detergents, chemicals, motor oil, beverages including juices, soft drinks, alcoholic beverages, etc. These containers and bottles are labelled to provide information such as the supplier of the container, price of product or the contents of the container.

Polymeric labels have an advantage over paper labels for their visual aesthetics of the container, no-label look, and superior mechanical properties, such as tensile strength and abrasion resistance.

In the bottled beverage industry, the labels on the bottles are subjected to bottling, packing, shipping and storage processes. Further, the labels must withstand being immersed in ice water for extended periods of time. In addition, the bottles used in the beverage industry are generally reused many times after cleaning and removing the labels prior to refilling and relabeling the bottles.

In order to remove paper labels, which are generally less aesthetically desirable, the labels are subjected to hot washing liquid such as dilute caustic soda that has been heated to 50° C.-90° C. On the other hand, polymeric labels do not possess the water permeability of paper labels, so polymeric labels have been found to be more difficult to completely remove with existing washing processes.

U.S. Pat. No. 9,422,465 discloses an acrylic emulsion pressure sensitive adhesive (PSA) that removes quickly and cleanly from glass and polymer-coated glass bottles in water at elevated temperatures and dilute caustic solution.

Surfactants have been used widely in emulsification, dispersion, cleaning, wetting and foaming processes. Emulsifiers for emulsion polymerization, which are used for producing polymers by emulsion polymerization, are known not only to take part in polymerization-initiating reactions and polymer-forming reactions but also to affect the mechanical stability, chemical stability, freezing stability, storage stability and the like of the resulting emulsions. Further, they are also known to give significant effects on physical properties of the emulsions, such as particle size, viscosity and foaming potential and, when formed into films, physical properties of the films, such as waterproofness, weatherability, adhesion and heat resistance.

Surfactants containing double bonds can be used as reactants, often called reactive surfactants. This type of surfactants used in polymerization are also called polymerizable and/or co-polymerizable surfactants. Among the reactive surfactants, those containing one or more phenyl ether groups as hydrophobic groups have found wide-spread utility for their excellent properties such as emulsifying property, dispersing property, and polymerization-stabilizing property. Thus, surfactants that are based on alkyl phenol ethoxylates (APES) have been widely used in emulsion polymerization. In recent years, however, a concern has arisen about a potential problem that nonyl phenol ethoxylates can show false hormone effects on organisms to disrupt the endocrine system. This so-called endocrine problem has given rise to research conducted in efforts to provide replacements for the reactive surfactants containing one or more phenyl ether groups.

U.S. Pat. No. 10,526,480 discloses an ultra-high solids emulsion comprising a plurality of multiphase polymer particles that contains an environmentally friendly acrylic-based copolymer for coatings and adhesives.

U.S. Pat. No. 9,546,305 discloses a pressure sensitive adhesive ("PSA") compositions comprising a polymer having at least one vinyl group and a Type I photo initiator bound to the polymer.

Accordingly, it would be desirable to produce a pressure sensitive adhesive ("PSA") that can be used with polymeric film labels, and that can facilitate easy removal of the label from containers during the washing process and also can be quickly and cleanly removed from the container.

SUMMARY OF THE INVENTION

These and other objects of the present invention will become apparent in light of the following disclosure.

One objective of the present disclosure relates to an emulsion comprising: a plurality of multiphase polymer particles comprising an acrylic-based copolymer derived from monomers comprising: an alkyl methacrylate; an alkyl acrylate; a hydroxyalkyl acrylate or hydroxyalkyl methacrylate; at least one acid; a carboxyalkyl (meth)acrylate; a vinyl ester, and at least one co-polymerizable surfactant.

Another objective of the present disclosure relates to an emulsion comprising: a plurality of multiphase polymer particles comprising an acrylic-based copolymer, at least one co-polymerizable surfactant, at least one alkylphenol ethoxylate (APE) free nonionic surfactant, and at least one APE free anionic surfactant in an aqueous medium in presence of a free-radical initiator and a buffer.

One more objective of the present disclosure relates to an adhesive composition comprising: a plurality of multiphase polymer particles comprising an acrylic-based copolymer derived from monomers comprising: an alkyl methacrylate; an alkyl acrylate; a hydroxyalkyl acrylate or hydroxyalkyl methacrylate; at least one acid; a carboxyalkyl (meth)acrylate; a vinyl ester, and at least one co-polymerizable surfactant.

DETAILED DESCRIPTION OF THE INVENTION

Before explaining at least one embodiment of the present disclosure in detail, it is to be understood that the present disclosure is not limited in its application to the details of construction and the arrangement of the components or steps or methodologies set forth in the following description. The present disclosure is capable of other embodiments or of being practiced or carried out in various ways. Also, it is to be understood that the phraseology and terminology employed herein is for the purpose of description and should not be regarded as limiting.

Unless otherwise defined herein, technical terms used in connection with the present disclosure shall have the meanings that are commonly understood by those of ordinary skill in the art. Further, unless otherwise required by context, singular terms shall include pluralities and plural terms shall include the singular.

All patents, published patent applications, and non-patent publications mentioned in the specification are indicative of the level of skill of those skilled in the art to which the present disclosure pertains. All patents, published patent applications, and non-patent publications referenced in any portion of this application are herein expressly incorporated by reference in their entirety to the same extent as if each individual patent or publication was specifically and individually indicated to be incorporated by reference.

All of the articles and/or methods disclosed herein can be made and executed without undue experimentation in light of the present disclosure. While the articles and methods of the present disclosure have been described in terms of preferred embodiments, it will be apparent to those of ordinary skill in the art that variations can be applied to the articles and/or methods and in the steps or in the sequence of steps of the method(s) described herein without departing from the concept, spirit and scope of the present disclosure. All such similar substitutes and modifications apparent to those skilled in the art are deemed to be within the spirit, scope and concept of the present disclosure.

As utilized in accordance with the present disclosure, the following terms, unless otherwise indicated, shall be understood to have the following meanings.

The use of the word "a" or "an" when used in conjunction with the term "comprising" can mean "one," but it is also consistent with the meaning of "one or more," "at least one," and "one or more than one." The use of the term "or" is used to mean "and/or" unless explicitly indicated to refer to alternatives only if the alternatives are mutually exclusive, although the disclosure supports a definition that refers to only alternatives and "and/or." Throughout this application, the term "about" is used to indicate that a value includes the inherent variation of error for the quantifying device, the method(s) being employed to determine the value, or the variation that exists among the study subjects.

References herein to "one embodiment," or "one aspect" or "one version" or "one objective" or "another embodiment" or "another aspect" or "another version" or "another objective" or "one more embodiment" of the invention can include one or more of such embodiment, aspect, version or objective, unless the context clearly dictates otherwise.

The term "at least one" refers to one as well as any quantity more than one, including but not limited to, 1, 2, 3, 4, 5, 10, 15, 20, 30, 40, 50, 100, etc. The term "at least one" can extend up to 100 or 1000 or more depending on the term to which it is attached.

All percentages, parts, proportions, and ratios as used herein are by weight of the total composition, unless otherwise specified. All such weights as they pertain to listed ingredients are based on the active level and therefore do not include solvents or by-products that can be included in commercially available materials, unless otherwise specified.

All references to singular characteristics or limitations of the present invention shall include the corresponding plural characteristics or limitations, and vice-versa, unless otherwise specified or clearly implied to the contrary by the context in which the reference is made.

Numerical ranges as used herein are intended to include every number and subset of numbers contained within that range, whether specifically disclosed or not. Further, these numerical ranges should be construed as providing support for a claim directed to any number or subset of numbers in that range.

As used herein, the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. The terms "or combinations thereof" and "and/or combinations thereof" as used herein refer to all permutations and combinations of the listed items preceding the term. For example, "A, B, C, or combinations thereof" is intended to include at least one of: A, B, C, AB, AC, BC, or ABC and, if order is important in a particular context, also BA, CA, CB, CBA, BCA, ACB, BAC, or CAB. Continuing with this example, expressly included are combinations that contain repeats of one or more items or terms, such as BB, AAA, AAB, BBC, AAABCCCC, CBBAAA, CABABB, and so forth. The skilled artisan will understand that typically there is no limit on the number of items or terms in any combination, unless otherwise apparent from the context.

For purposes of the following detailed description, other than in any operating examples, or where otherwise indicated, numbers that express, for example, quantities of ingredients used in the specification and claims are to be understood as being modified in all instances by the term "about". The numerical parameters set forth in the specification and attached claims are approximations that can vary depending upon the desired properties to be obtained in carrying out the invention.

The term "or combinations thereof", "and combinations thereof", and "combinations thereof" as used herein refers to all permutations and combinations of the listed items preceding the term.

The term "about" refers to a range of values ±10% of a specified value. For example, the phrase "about 200" includes ±10% of 200, or from 180 to 220.

The term "polymerization" or "polymerizing" refers to methods for chemically reacting monomer compounds to form polymer chains. The polymer chain can be alternating, blocked, or random. The type of polymerization method can be selected from a wide variety of methods and include the following non-limiting examples: poly condensation, step growth polymerization, and free radical polymerization.

The term "polymer" refers to any large molecule, which includes macromolecules. The term "polymer" refers to a large molecule comprising one or more types of monomer residues (repeating units) connected by covalent chemical bonds. Non-limiting examples of polymers include homopolymers, and non-homopolymers such as copolymers, terpolymers, tetrapolymers and the higher analogues.

The term "monomer" refers to a small molecule that chemically bonds during polymerization to one or more monomers of the same or different kind to form a polymer.

The term "copolymer" herein refers to a polymer prepared from more than one monomers.

As used herein, the term "multiphase" means that the polymer particles include two or more phases.

As used herein, the term "emulsion" refers to a homogeneous multiphase system that is made of extremely fine particles and liquids. The liquids can include aqueous and/or non-aqueous solutions and/or suspensions.

The term "water-dispersible", as used herein with respect to pressure sensitive adhesive prepared from multiphase polymer emulsion intended to be synonymous with the terms "water-dissipatable", "water-disintegratable", "water-dis solvable", "water-dispellable", water-removable", "hydrosoluble", and "hydrodispersible" and is intended to mean that the pressure sensitive adhesive is therein or therethrough dispersed or dissolved by the action of water.

The terms "dispersed", "dispersible", "dissipate", or "dissipatable" mean that, using a sufficient amount of deionized water (e.g., about 20 to about 200:1 water: adhesive by weight) to form a loose suspension or slurry of the pressure sensitive adhesive, at room temperature of about 18° C. to about 50° C., and within a time period of up to 0.5-5 minutes.

According to one of the embodiments, the present invention relates to a water-dispersible pressure sensitive adhesive composition for bonding a label to a container, a process of preparing the composition and a method of bonding a label to a container with the composition.

One objective of the present disclosure relates to an emulsion comprising: a plurality of multiphase polymer particles comprising an acrylic-based copolymer derived from monomers comprising: an alkyl methacrylate; an alkyl acrylate; a hydroxyalkyl acrylate or hydroxyalkyl methacrylate; at least one acid; a carboxyalkyl (meth)acrylate; a vinyl ester, and at least one co-polymerizable surfactant.

According to one embodiment of present disclosure, alkyl methacrylates can include alkyl methacrylates having 1 to about 20 carbon atoms in the alkyl group. According to one of the embodiments of present disclosure, alkyl methacrylate can include methyl methacrylate, ethyl methacrylate, 2-ethylhexyl methacrylate, n-butyl methacrylate, sec-butyl methacrylate, tert-butyl methacrylate and dodecyl methacrylate.

According to one more embodiment of present disclosure, the multiphase polymer particles comprising an acrylic-based copolymer derived from monomers comprising from about 20% to about 60% by weight of at least one alkyl methacrylate.

According to another embodiment, the acrylic-based copolymer derived from monomers comprising from about 20% to about 25%, from about 25% to about 30%, from about 30% to about 35%, from about 35% to about 40%, from about 40% to about 45%, from about 45% to about 50%, from about 50% to about 55%, from about 55% to about 60% by weight of at least one alkyl methacrylate.

According to one more embodiment of present disclosure, alkyl acrylates can include alkyl acrylates having 1 to about 20 carbon atoms in the alkyl group. In one non-limiting embodiment, the alkyl acrylate can be selected from the group consisting of n-butyl acrylate, sec-butyl acrylate, tert-butyl acrylate, 2-ethylhexyl acrylate, iso-bornyl acrylate, iso-bornyl methyl acrylate, ethyl acrylate, iso-octyl acrylate, decyl acrylate, and hexyl acrylate.

According to one more embodiment of present disclosure, the multiphase polymer particles comprising an acrylic-based copolymer derived from monomers comprising from about 20% to about 80% by weight of at least one alkyl acrylate.

According to another embodiment, the acrylic-based copolymer derived from monomers comprising from about 20% to about 25%, from about 25% to about 30%, from about 30% to about 35%, from about 35% to about 40%, from about 40% to about 45%, from about 45% to about 50%, from about 50% to about 55%, from about 55% to about 60%, from about 60% to about 65%, from about 65% to about 70%, from about 70% to about 75%, from about 75% to about 80% by weight of at least one alkyl acrylate.

According to another embodiment of present disclosure, hydroxyalkyl acrylate or hydroxyalkyl methacrylate can include, but not limited to, hydroxyethyl acrylate, hydroxyethyl methacrylate, hydroxypropyl acrylate, hydroxypropyl methacrylate, 4-hydroxybutyl acrylate and 4-hydroxybutyl methacrylate.

According to one more embodiment of present disclosure, the multiphase polymer particles comprising an acrylic-based copolymer derived from monomers comprising from about to about 10% by weight of at least one hydroxyalkyl acrylate or hydroxyalkyl methacrylate.

According to another embodiment, the acrylic-based copolymer derived from monomers comprising from about 0.05% to about 0.5%, from about 0.5% to about 1%, from about 1% to about 1.5%, from about 1.5% to about 2%, from about 2% to about 2.5%, from about 2.5% to about 3%, from about 3% to about 3.5%, from about 3.5% to about 4%, from about 4% to about 4.5%, from about 4.5% to about 5%, from about 5% to about 5.5%, from about 5.5% to about 6%, from about 6% to about 6.5%, from about 6.5% to about 7%, from about 7% to about 7.5%, from about 7.5% to about 8%, from about 8% to about 8.5%, from about 8.5% to about 9%, from about 9% to about 9.5%, from about 9.5% to about 10% by weight of at least one hydroxyalkyl acrylate or hydroxyalkyl methacrylate.

According to one more embodiment of present disclosure, acids can include, but not limited to, acrylic acid, methacrylic acid, itaconic acid, dimethacrylic acid, maleic acid, and fumaric acid.

According to one more embodiment of present disclosure, the multiphase polymer particles comprising an acrylic-based copolymer derived from monomers comprising from about to about 15% by weight of at least one acid monomer.

According to another embodiment, the acrylic-based copolymer derived from monomers comprising from about 0.5% to about 1%, from about 1% to about 1.5%, from about 1.5% to about 2%, from about 2% to about 2.5%, from about 2.5% to about 3%, from about 3% to about 3.5%, from about 3.5% to about 4%, from about 4% to about 4.5%, from about 4.5% to about 5%, from about 5% to about 5.5%, from about 5.5% to about 6%, from about 6% to about 6.5%, from about 6.5% to about 7%, from about 7% to about 7.5%, from about 7.5% to about 8%, from about 8% to about 8.5%, from about 8.5% to about 9%, from about 9% to about 9.5%, from about 9.5% to about 10%, from about 10% to about 10.5%, from about 11% to about 11%, from about 11.5% to about 12%, from about 12.5% to about 13%, from about 13% to about 13.5%, from about 13.5% to about 14%, from about 14% to about 14.5%, from about 14.5% to about 15% by weight of at least one acid monomer.

According to one more embodiment of present disclosure, carboxyalkyl (meth)acrylate monomer can include β-carboxyethyl acrylate (β-CEA), poly (2-carboxyethyl) acrylate, 2-carboxyethyl methacrylate, and combinations thereof. In some embodiments, the functional monomer with carboxylic acid functionality also can contain metal ion such as sodium, potassium and/or calcium, to reach better emulsion polymerization effect.

According to one more embodiment of present disclosure, the multiphase polymer particles comprising an acrylic-based copolymer derived from monomers comprising from about to about 10% by weight of at least one carboxyalkyl (meth)acrylate monomer.

According to another embodiment, the acrylic-based copolymer derived from monomers comprising from about 0.5% to about 1%, from about 1% to about 1.5%, from about 1.5% to about 2%, from about 2% to about 2.5%, from about 2.5% to about 3%, from about 3% to about 3.5%, from about 3.5% to about 4%, from about 4% to about 4.5%, from about 4.5% to about 5%, from about 5% to about 5.5%, from about 5.5% to about 6%, from about 6% to about 6.5%, from about 6.5% to about 7%, from about 7% to about 7.5%, from about 7.5% to about 8%, from about 8% to about 8.5%, from about 8.5% to about 9%, from about 9% to about 9.5%, from about 9.5% to about 10% by weight of at least one carboxyalkyl (meth)acrylate monomer.

According to one more embodiment of present disclosure, vinyl ester can include vinyl acetate, vinyl propionate, vinyl butyrate, vinyl iso-butyrate, vinyl valerate, and vinyl versatile.

According to one more embodiment of present disclosure, the multiphase polymer particles comprising an acrylic-based copolymer derived from monomers comprising from about to about 10% by weight of at least one vinyl ester.

According to another embodiment, the acrylic-based copolymer derived from monomers comprising from about 0.5% to about 1%, from about 1% to about 1.5%, from about 1.5% to about 2%, from about 2% to about 2.5%, from about 2.5% to about 3%, from about 3% to about 3.5%, from about 3.5% to about 4%, from about 4% to about 4.5%, from about 4.5% to about 5%, from about 5% to about 5.5%, from about 5.5% to about 6%, from about 6% to about 6.5%, from about 6.5% to about 7%, from about 7% to about 7.5%, from about 7.5% to about 8%, from about 8% to about 8.5%, from about 8.5% to about 9%, from about 9% to about 9.5%, from about 9.5% to about 10% by weight of at least one vinyl ester.

According to another embodiment of present disclosure, the co-polymerizable surfactant can have the following structure represented by Formula (I):

(I)

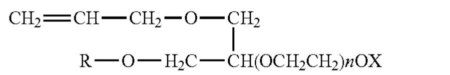

where: R is $C_9$-$C_{15}$ alkyl or $C_7$-$C_{11}$ alkyl-phenyl; X is H, $SO_3NH_4$, or $SO_3Na$; and n is 3 to 50. In one non-limiting embodiment, R is $C_{10}$-$C_{14}$ alkyl, X is H or $SO_3NH_4$, and n is 5 to 40. In another non-limiting embodiment, n is 5 to 25, or 5 to 20, or 5 to 15 (e.g., n=10).

According to one more embodiment of present disclosure, co-polymerizable surfactants wherein R is $C_{10}$-$C_{14}$ alkyl can include ADEKA REASOAP series ER and SR surfactants (Adeka Corporation; Tokyo, Japan), such as ER-10, ER-20, ER-30, ER-40, SR-10, SR-20, SR-1025 and SR-2025. For example, ADEKA REASOAP SR-10, which includes ammonium salts of poly(oxy-1,2-ethanediyl), alpha-sulfo-omega-[1-(hydroxymethyl)-2-(2-propenyloxy)ethoxy]-, $C_{10-14}$-branched alkyl ethers, can be used. Exemplary copolymerizable surfactants in which R is $C_7$-$C_{11}$ alkyl-phenyl can include ADEKA REASOAP series NE and SE surfactants, such as NE-10, NE-NE-30, NE-40, NE-50, SE-10N, SE-20N, and SE-1025N. Co-polymerizable surfactants can include Hitenol AR-15 from DKS Co. Ltd.

According to one more embodiment of the present disclosure, the multiphase polymer particles comprising an acrylic-based copolymer derived from monomers comprising from about to about 15% by weight of at least one co-polymerizable surfactant.

According to another embodiment, the acrylic-based copolymer derived from monomers comprising from about 0.01% to about 1%, from about 1% to about 1.5%, from about 1.5% to about 2%, from about 2% to about 2.5%, from about 2.5% to about 3%, from about 3% to about 3.5%, from about 3.5% to about 4%, from about 4% to about 4.5%, from about 4.5% to about 5%, from about 5% to about 5.5%, from about 5.5% to about 6%, from about 6% to about 6.5%, from about 6.5% to about 7%, from about 7% to about 7.5%, from about 7.5% to about 8%, from about 8% to about 8.5%, from about 8.5% to about 9%, from about 9% to about 9.5%, from about 9.5% to about 10%, from about 10% to about 10.5%, from about 11% to about 11%, from about 11.5% to about 12%, from about 12.5% to about 13%, from about 13% to about 13.5%, from about 13.5% to about 14%, from about 14% to about 14.5%, from about 14.5% to about 15% by weight of at least one co-polymerizable surfactant.

Another objective of the present disclosure relates to an emulsion comprising: a plurality of multiphase polymer particles comprising an acrylic-based copolymer, at least one co-polymerizable surfactant, at least one alkylphenol ethoxylate (APE) free nonionic surfactant, and at least one APE free anionic surfactant in an aqueous medium in presence of a free-radical initiator and a buffer.

According to another embodiment of present disclosure, APE free anionic surfactants used in the present disclosure can include, but are not limited to, sodium lauryl ether sulfate, sodium lauryl ethoxylate, sodium tridecyl ether sulfate, sodium salt of linear sulfated alcohol ethoxylate, sodium alpha olefin sulphonate, sodium dodecylbenzene sulphonate, disodium alkyl diphenyloxide sulphonate, sodium dioctyl sulfosuccinate, sodium lauryl ether sulfate and alkyldiphenyloxide disulphonate disodium salt.

According to one more embodiment of present disclosure, APE free anionic surfactants can include, but are not limited to, Rhodapex® AB 20, Rhodapon® SB 8208S, Rhodapex® LA Rhodapex® EST 30. ABEX JKB, Abex 2005, Rhodacal® A 246 L, Rhodacal® DS-10, Rhodacal® DSB, Aerosol® A 102 and Aerosol® OT-75, produced by Solvay S.A.; Polystep® B 19 and Polystep® B 23 produced by Stepan Company; and DowfaX™ 2A1 produced by The Dow Chemical Company.

According to one more embodiment of present disclosure, the emulsion comprising from about 0.01 to about 5% by weight of at least one APE free anionic surfactants.

According to one more embodiment of present disclosure, the emulsion comprising from about 0.01% to about 1%, from about 1% to about 1.5%, from about 1.5% to about 2%, from about 2% to about 2.5%, from about 2.5% to about 3%, from about 3% to about 3.5%, from about 3.5% to about 4%, from about 4% to about 4.5%, from about 4.5% to about 5% by weight of at least one APE free anionic surfactants.

According to another embodiment of present disclosure, nonionic surfactant is selected from one or more nonionic polyether surfactants. Suitable nonionic polyether surfactants used in the compositions of the present invention include for example but are not limited to polyoxyethylene aliphatic ethers, such as polyoxyethylene lauryl ether and polyoxyethylene oleyl ether; fatty acids, such as polyoxyethylene laurate and polyoxyethylene oleate, as well as condensates of ethylene oxide with resin acids and tall oil acids; polyoxyethylene amide and amine condensates such as N-polyoxyethylene lauramide, and N-lauryl-N-polyoxyethylene amine and the like; and polyoxyethylene thioethers such as polyoxyethylene n-dodecyl thio-ether.

According to one more embodiment of present disclosure, non-ionic surfactants that can also include a series of surface-active agents available from BASF under the Pluronic™ and Tetronic™ trade names. Pluronic surfactants are ethylene oxide (EO)/Propylene oxide (PO)/ethylene oxide block copolymers that are prepared by the controlled addition of PO to the two hydroxyl groups of propylene glycol. EO is then added to sandwich this hydrophobe between two hydrophilic groups, controlled by length to constitute from 10% to 80% (w/w) of the final molecule. Pluronic surfactants are PO/EO/PO triblock copolymers prepared by adding EO to ethylene glycol to provide a hydrophile of designated molecular weight. PO is then added to obtain hydrophobic blocks on the outside of the molecule. Tetronic surfactants are tetra-functional block copolymers derived from the sequential addition of PO and EO to ethylene-diamine. Tetronic surfactants are produced by the sequential addition of EO and PO to ethylenediamine. In addition, a series of ethylene oxide adducts of acetylenic glycols, sold commercially by Air Products under the Surfynol™ trade name, are suitable as nonionic surfactants. The block polymer having $(EO)_x$, and $(PO)_y$ blocks, wherein x is ranging from about 2 to 20; y is ranging from about 20 to about 80.

The nonionic surfactants used herein are commercially available, e.g., under the trade names Pluronic®, such as Pluronic® P 65, P84, P 103, P 105, P 123 and Pluronic® L 31, L 43, L 62, L 62 LF, L 64, L 81, L 92 and L 121, Pluraflo® such as Pluraflo® L 860, L1030 and L 1060; Pluriol® such as Pluriol® WSB-125, Tetronic®, such as Tetronic® 704, 709, 1104, 1304, 702, 1102, 1302, 701, 901, 1101, 1301 (BASF SE), Agrilan® AEC 167 and Agrilan® AEC 178 (Akcros Chemicals), Antarox® B/848 (Rhodia), Berol® 370 and Berol® 374 (Akzo Nobel Surface Chemistry), Dowfax® 50 C15, 63 N10, 63 N30, 64 N40 and 81 N10 (Dow Europe), Genapol® PF (Clamant), Monolan®, such as Monolan® PB, Monolan® PC, Monolan® PK (Akcros Chemicals), Panox® PE (Pan Asian Chemical Corporation), Symperonic®, such as Symperonic® PE/L, Symperonic® PE/F, Symperonic® PE/P, Symperonic® PE/T (ICI Surfactants), Tergitol® XD, Tergitol® XH and Tergitol® XJ (Union Carbide), Triton® CF-32 (Union Carbide), Teric PE Series (Huntsman) and Witconol®, such as Witconol® APEB, Witconol® NS 500 K and the like. Likewise particular preference is given to poly(ethoxylate-co-propoxylates) of C1-C10 alkanols, having a number average molecular weight (Mw) of from 1000 to 5000 Dalton Particularly preferred examples include Atlox® G 5000 (Akzo Nobel), Tergitol®XD, Pluronic® P105 and Pluriol® WSB-125 and the like. Alcohol ethoxylates nonionic surfactants, such as Rhodasurf ON-877 or -6530.

According to one more embodiment of present disclosure, the emulsion comprising from about 1 to about 5% by weight of at least one APE free nonionic surfactants.

According to one more embodiment of present disclosure, the emulsion comprising from about 1% to about 1.5%, from about 1.5% to about 2%, from about 2% to about 2.5%, from about 2.5% to about 3% by weight of at least one APE free nonionic surfactants.

According to one more embodiment of present disclosure, the free-radical initiators can be water-soluble initiators. Examples of the water-soluble initiators can include, but are not limited to, persulfates such as sodium persulfate ($Na_2S_2O_8$) and potassium persulfate ($K_2S_2O_8$); peroxides such as hydrogen peroxide and tert-butyl hydroperoxide (t-BHP); and azo compounds such as VAZO™ initiators, commercially available from The Chemours Company. They can be used alone or in combination with one or more reducing agents or activators, for example, bisulfites, metabisulfites, ascorbic acid, erythorbic acid, sodium formaldehyde sulfoxylate, ferrous sulfate, ferrous ammonium sulfate, and ferric ethylenediamine tetraacetic acid.

In one non-limiting embodiment, the free-radical initiator is selected from the group consisting of sodium persulfate, ammonium persulfate, potassium persulfate, t-butyl hydroperoxide, sodium formaldehydesulfoxylate, zinc formaldehydesulphoxylate, and disodium salts of 2-hydroxy-2-sufinatoacetic acid and 2-hydroxy-2-sufonatoacetic acid such as Bruggolite® FF6/M/FF7, commercially available from Briiggemann Chemical.

According to one more embodiment of present disclosure, the amounts of the free-radical initiators employed can be varied from 0.1 to 2% by weight, based on the total amount of the monomers to be polymerized. The way the initiator is added to the polymerization reactor during the free-radical aqueous emulsion polymerization is not critical. It can either all be introduced into the polymerization reactor at the beginning, or added continuously or stepwise as it is consumed during the free-radical aqueous emulsion polymerization. In detail, this depends in a manner known to an ordinary person skilled in the art both from the chemical nature of the free-radical initiator system and on the polymerization temperature.

According to one more embodiment of present disclosure, the buffer used in the present disclosure can be selected from the group consisting of disodium pyrophosphate, sodium citrate, sodium bicarbonate and sodium carbonate.

According to one more embodiment of present disclosure, the aqueous medium can be composed either of water alone or of mixtures of water and water-miscible liquids such as methanol. In one non-limiting embodiment, the aqueous medium is water alone.

In one non-limiting embodiment, the acrylic-based copolymer can be derived from about to about 60% by weight of the alkyl methacrylate, from about 20 to about 80% by weight of the alkyl acrylate, from about 0.05 to about 10% by weight of the hydroxyalkyl acrylate or hydroxyalkyl methacrylate, from about 0.3 to about 3% by weight of the acid, from about 0.5 to about 15% by weight of the carboxyalkyl acrylate, from about 0.5 to about 10% by weight of the vinyl ester or vinyl lactam, and from about 0.01 to about 15% by weight of the copolymerizable surfactant.

In another non-limiting embodiment, the acrylic-based copolymer can be derived from about 50 to about 70% by weight of the alkyl methacrylate, from about 40 to about 80% by weight of the alkyl acrylate, from about 0.1 to about 10% by weight of the hydroxyalkyl acrylate or hydroxyalkyl methacrylate, from about 0.3 to about 3% by weight of at the acid, from about 0.5 to about 15% by weight of the carboxyalkyl acrylate from about 0.1 to about 15% by weight of the vinyl ester, and from about 1 to about 15% by weight of the copolymerizable surfactant.

According to one of the embodiments, a chain transfer agent or other molecular weight regulator, to control average polymer chain length of the acrylic-based copolymers can be used for the polymerization in the present disclosure. Non-limiting examples of the chain transfer agent can include 1-dodecyl mercaptan (1-DDM), t-dodecyl mercaptan (t-DDM), 1-butyl mercaptan, ascorbic acid, monothioglycerol, mercapto acetates, butylated hydroxyanysole, and long chain alcohols. In one non-limiting embodiment the amount of chain transfer agent is from about 0.05% to about 0.3% by weight of the monomers. According to one more embodiment, the chain transfer agent is from about 0.05% to about 0.1%, about 0.1 to about 0.2%, or about 0.2% to about 0.3% by weight of the monomers.

In one non-limiting embodiment, the average particle size of the multiphase polymer particles that are dispersed in the emulsion can be varied from about 100 nm to about 600 nm. The size distribution of the dispersed particles can be monomodal, bimodal or multimodal. In the case of monomodal particle size distribution, the average particle size of the polymer particles dispersed in the emulsion can be less than 500 nm. In the case of bimodal or multimodal particle size distribution, the particle size can also be up to about 600 nm. By average particle size here is meant the d50 value of the particle size distribution, i.e., 50% by weight of the total mass of all the particles have a particle diameter smaller than the d50 value. The particle size distribution can be determined using the dynamic light scattering with Microtrac's Nano-flex model.

In another non-limiting embodiment, the average particle size of the multiphase polymer particles that are dispersed in the emulsion can be varied from about 100 to about 200 nm, from about 200 nm to about 300 nm, from about 300 nm to about 400 nm, from about 400 nm to about 500 nm, from about 500 nm to about 600 nm.

In another non-limiting embodiment, the acrylate-based copolymer has a glass transition temperature (Tg) of from about −60° C. to about +70° C., or from about −55° C. to about +60° C. The glass transition temperature can be determined by customary methods such as differential scanning calorimetry (For example, ASTM D3418-82 Standard Test Method for Transition Temperatures of Polymers by Thermal Analysis, midpoint temperature).

In another embodiment, the acrylate-based copolymer has a glass transition temperature (Tg) of from about −60° C. to about −45° C., from about −45° C. to about −30° C., from about −30° C. to about −15° C., from about −15° C. to about 0° C., from about 0° C. to about 20° C., from about 20° C. to about 40° C., from about 40° C. to about 60° C., or from about 60° C. to about 70° C.

In one embodiment, the acrylate-based copolymer has a molecular weight (Mw) measure is in the range from about 30,000 to 2,00,0000 units (Daltons). Mw was determined by GPC in accordance with standard method SEA-4716; solvent: Tetrahydrofuran.

In another embodiment, the acrylate-based copolymer has a molecular weight (Mw) measure is in the range from about 30,000 to 60,000 units, from about 60,000 to 90,000 units, from about 90,000 to 100,000 units, from about 100,000 to 200,000 units, from about 200,000 to 300,000 units, from about 300,000 to 400,000 units, from about 400,000 to 500,000 units, from about 500,000 to 600,000 units, from about 600,000 to 700,000 units, from about 700,000 to 800,000 units, from about 800,000 to 900,000 units, from about 1,000,000 to 1,100,000 units, from about 1,100,000 to 1,200,000 units, from about 1,200,000 to 1,300,000 units, from about 1,300,000 to 1,400,000 units, from about 1,400,000 to 1,500,000 units, from about 1,500,000 to 1,600,000 units, from about 1,600,000 to 1,700,000 units, from about 1,700,000 to 1,800,000 units, from about 1,800,000 to 1,900,000 units, from about 1,900,000 to 2,000,000 units.

In another non-limiting embodiment, the adhesive compositions can be composed solely of the solution medium and the copolymer emulsion. Alternatively, the adhesive composition can also comprise other additives, examples being fillers, dyes, flow control agents, thickeners (e.g. associative thickeners), defoamers, pigments, wetting agents or tackifiers (tackifying resins). For improved surface wetting, the adhesives can comprise wetting assistants, examples being fatty alcohol ethoxylates, polyoxy-ethylenes, polyoxy-propylenes or sodium dodecylsulfonates. The amounts of additives are generally from about 0.05 to about 5 parts by weight, or from about 0.1 to about 3 parts by weight, per 100 parts by weight of polymer (solids).

In one non-limiting embodiment, the adhesive composition of the present disclosure can be a pressure-sensitive adhesive (PSA). A PSA is a viscoelastic adhesive whose set film at room temperature (20° C.) in the dry state remains permanently tacky and adhesive. The bonding to substrates takes place immediately, upon gentle applied pressure.

In one more non-limiting embodiment, the adhesive composition of the present disclosure can be used for producing self-adhesive articles. The articles are at least partly coated with the PSA. The self-adhesive articles can be removed again after bonding. The self-adhesive articles can be, for example, sheets, tapes or labels. Examples of suitable backing materials include paper, polymeric films, and metal foils. In the case of self-adhesive tapes of the present disclosure, the tapes can be coated on one side or both sides comprising the substances above. In the case of self-adhesive labels of the present disclosure, the labels can, be of paper or of a thermoplastic film. Suitable thermoplastic films include, for example, films of polyolefins (e.g., polyethylene, polypropylene), polyolefin copolymers, films of polyesters (e.g., polyethylene terephthalate) or polyacetate. The surfaces of the thermoplastic polymer films can be corona-treated. The labels are coated with adhesive on one side. The substrates for the self-adhesive articles are paper and polymer films. In one non-limiting embodiment, the self-adhesive articles can be paper labels.

In another non-limiting embodiment, the emulsion of the present disclosure can be used in a coating process in the lab consists of applying a product to the lab coating moving web. The emulsion coated on siliconized release liner followed by drying step for removing water in the oven for 2 minutes at 90° C. The thickness of the dry film is 0.7-1.0 mill. Then, the film is transferred to the dissoluble paper by simultaneous rolling of the release liner coated with adhesive and paper face stock between rubber rolls of laminator at the room temperature.

In one more non-limiting embodiment, the articles are coated on at least one surface at least partly with an adhesive composition of the present disclosure. The adhesive composition can be applied to the articles by typical methods such as knife coating or spreading. Application is generally followed by a drying step for removing the water. The thickness of the dried film can be varied from about 0.1 to about 3 millimeters.

According to one of the embodiments, the substrates to which the self-adhesive articles can advantageously be applied can be, for example, metal, wood, glass, paper or plastic. The self-adhesive articles are suitable more particularly for bonding to packaging surfaces, cartons, plastic packaging, books, windows, motor vehicle bodies or bodywork parts. The self-adhesive articles can be removed from the articles again by hand, without residue of adhesive on the article. Adhesion to the articles is good, and yet the sheets, tapes, and labels are readily removable. This good removability is retained even after a relatively long time. Paper labels exhibit good strikethrough behavior and good printability.

EXAMPLES

The polymers and their applications according to the present disclosure can be prepared and used according to the examples set out below. These examples are presented herein for purposes of illustration of the present disclosure and are not intended to be limiting, for example, the preparations of the polymers and their applications.

The polymer were prepared according to the Table 1 and further described below.

Example 1: Polymer Preparation

The reaction was performed under flowing nitrogen in 2 L jacketed reactor connected with the water bath thermostat. The reactor was equipped with a reflux condenser, a thermocouple, two pitched turbine agitators and three inlet lines connected with pumps. A pre-emulsion was formed using the following procedure. DI water (383 g), sodium bicarbonate (2 g), Aerosol A-102 (46 g), Tergitol 15-S-20 (3.0 g) C. 0.16 g of t-butyl hydroperoxide and 1.91 g of Bruggolite FF6 solution was charged into the reactor. After 8-10 min the seed formed. The reactor temperature was set to 85° C.-86° C. When the temperature reached 86° C., the pre-emulsion and remaining initiator solution was charged into reactor over 120 minutes.

An exothermic polymerization reaction was taken place after a short induction period. When the polymerization completed, a remaining 9.54 g of Bruggolite FF6 and 8.87 g of t-butyl hydroperoxide solutions were added to reactor over 30 minutes at 55° C. to reduce unreacted monomer. Then reactor temperature cooled down to 30° C. and biocide Kathon LX was added. The base polymer was filtered through cheese cloth and packed.

TABLE 1

| | Examples | | | | | | | | | | |
|---|---|---|---|---|---|---|---|---|---|---|---|
| Examples | Exp 1 | Exp 2 | Exp 3 | Exp 4 | Exp 5 | Exp 6 | Exp 7 | Exp 8 | Exp 9 | Exp 10 | Exp 11 |
| Intial Reactor Charges | grams | grams | grams | grams | grams | grams | grams | gramms | grams | grams | grams |
| Aerosol 102 | 0.6 | 0.6 | 15 | 0.5 | 0.5 | 0.5 | 0.4 | 0.5 | 0.5 | 1.3 | 2.5 |
| Tergitol 15-S-20 | 1.0 | 0 | 0 | 0 | 0 | 0 | 0 | 0 | 0 | 0 | 0 |
| Pluronic L-121 | 0.0 | 0.5 | 1.8 | 5 | 0.5 | 0.5 | 0 | 0 | 0 | 0 | 0 |
| Antarox L-64 | 0.0 | 0 | 0 | 0 | 0 | 0 | 0 | 2 | 2 | 2 | 2 |
| DDM | 1.5 | 0 | 0 | 0 | 0 | 0 | 0 | 0 | 0 | 0 | 0 |
| Vinyl acetate (VAM) | 15 | 10 | 15 | 10 | 0 | 10 | 0 | 0 | 0 | 10 | 10 |
| Methyl Acrylate | 0 | 0 | 0 | 0 | 0 | 0 | 0 | 0 | 0 | 0 | 6 |
| 2-hydroxypropyl acrylate (2-HPA) | 0 | 0 | 0 | 0 | 10 | 0 | 4 | 6 | 6 | 0 | 0 |
| Butyl acrylate (BA) | 42 | 10 | 40 | 10 | 20 | 10 | 20 | 14 | 14 | 20 | 14 |
| Acrylic acid (GAA) | 0.3 | 0.3 | 0.3 | 0.3 | 3 | 0.3 | 0.3 | 0.5 | 0.5 | 0.3 | 0.5 |
| Pre-Emulsion INGREDIENTS | | | | | | | | | | | |
| Aerosol 102 | 46 | 40 | 20 | 40 | 40 | 40 | 30 | 30 | 30 | 40 | 20 |
| Tergitol 15-S20 | 3 | 0 | 0 | 0 | 0 | 0 | 0 | 0 | 0 | 0 | 0 |
| Pluronic L-121 | 0 | 14 | 12 | 14 | 14 | 14 | 0 | 0 | 0 | 0 | 0 |
| Antharox L-64 | 0 | 0 | 0 | 0 | 0 | 0 | 0 | 12 | 12 | 12 | 12 |
| Reasoap SR-1025 | 0 | 16 | 18 | 16 | 16 | 16 | 18 | 0 | 0 | 0 | 0 |
| Reasoap SR-2025 | 0 | 0 | 0 | 0 | 0 | 0 | 0 | 48 | 48.0 | 16.0 | 48.0 |
| DDM | 0 | 4.5 | 4.5 | 4.5 | 4.5 | 4.5 | 4 | 2 | 2.0 | 2.0 | 1.0 |
| 2-carboxyethyl acrylate (B-CEA) | 30 | 12.3 | 15 | 12.3 | 14 | 12.3 | 14.0 | 21.0 | 21.0 | 15.00 | 21.00 |
| 2-Hydroxypropyl acrylate, (2-HPA) | 10 | 0 | 10 | 12.3 | 12 | 0 | 6.0 | 100 | 100.0 | 10.0 | 100.0 |
| Methyl methacrylate (MMA) | 15 | 30.7 | 0 | 30.7 | 0 | 30.7 | 0 | 0 | 0 | 0 | 0 |
| Vinyl acetate (VAM) | 52 | 68 | 120 | 80 | 100 | 80 | 120 | 120 | 120.0 | 120.0 | 90.0 |
| Butyl acrylate (BA) | 633.8 | 380 | 371.5 | 380.2 | 393.5 | 420.7 | 401.5 | 330.5 | 330.5 | 371.0 | 361.0 |
| Acrylic acid (GAA) | 30 | 46 | 35 | 36.2 | 36.0 | 36.2 | 36 | 6.0 | 6.0 | 35.0 | 6.0 |
| Label Dispersability in water at 18° C. | 2 | 4 | 5 | 5 | 4 | 1 | 3 | 5 | 4 | 5 | 6 |
| Adhesive's Residuals Wash off SS | n/a | n/a | n/a | n/a | n/a | n/a | n/a | 0 | 4 | 3 | 5 |
| Adhesive's Residuals Wash off HDPE | 0 | 4 | 4 | 5 | 4 | 0 | 2 | 0 | n/a | n/a | n/a |
| Partcle size (nm) | 340 | 250 | 116 | 230 | 249 | 265 | 245 | 160 | 207 | 165 | 157 |
| Molecular weight (daltons) | 1,604,803 | 115888 | X | X | X | X | X | 77,408 | X | X | 248,672 |

*SS Stainless steel;

**HDPE high density polyethylene were charged into 1 L container and mixed for 10-15 minutes. Then, beta-carboxylated acrylate (30 g), 2-hydroxypropyl acrylate (10 g), methyl methacrylate (15 g), vinyl acetate (52 g), dodecyl mercaptan(1.5 g), butyl acrylate (647.3 g), and acrylic acid (30 g) were charged into the same jar under agitation and mix for 30 minutes at 500 rpm to form a homogeneous emulsion.

The initiator solution was prepared by mixing 31 g of water with 4.79 g of t-butyl hydroperoxide. The activator solution was prepared by mixing 36.18 g of water with 3.77 g of Bruggolite FF6. The reactor was heated up to 78° C.-79°

Then the polymer was blended into the final product (Table 2) with following ingredients of specific weight:

TABLE 2

| Product Formulation | |
|---|---|
| Product | Amount |
| Polymer | 200 g |
| Defoamer DeeFo-215 | 0.3 g |

TABLE 2-continued

| Product Formulation | |
|---|---|
| Product | Amount |
| Wetting agent Dapro W-95HS | 1.4 g |
| Ammonia Hydroxide | 1.0 g |
| Thickener Rheolate-278 | 0.8 g |

The blend was coated into dissoluble paper with the film thickness of 0.8-0.9 mils.

Dispersibility Test:

Label's Dispersibility numbers identified in the scale between 0-5. (0—No dispersibility, 5—Best dispersibility; Table 3) under spraying a cold water on to label applied to HDPE surface over 0.5 to 3 minutes of sample's dispersibility after immersing it into cold water after 0.5-5 minutes. AS&T Analytical reports: CF-0091496, AF-0090744.

The coated and conditioned film prepared for a wash off test was also used for a dispersibility test. 2×1 in label placed in room temperature water, allow water to fully wet the paper. Slightly agitate label to disperse the remainder of the paper/adhesive construction. Observe the size and texture of the paper particles. Take note of time it takes for the label to disperse. Rank a dispersibility of the label between 0 and 5 (0-label's dispersibility over 15-30 sec). Rank a dispersibility of label between 0 and 5.

TABLE 3

| Dispersibility definitions Dispersibility | |
|---|---|
| Rank | Definition |
| 0 | does not disperse |
| 1 | does not disperse- label and adhesive may start to separate, dispersed pieces remain tacky |
| 2 | >25% of the label disperses into medium to large pieces within 30 seconds, dispersed pieces remain tacky |
| 3 | >50% of the label disperses into medium to large pieces within 30 seconds, dispersed pieces are not tacky |
| 4 | >70% of the label disperses into small to medium pieces within 30 seconds, dispersed pieces are not tacky |
| 5 | >90% of label disperses within 30 seconds and breaks into small pieces, dispersed pieces are not tacky |

Dispersibility test was performed and the coated sample of Example 1 and the adhesive did not disperse after immersing into water (rating: 2).

Wash Off Adhesive's Residual SS Test:

An adhesive was applied to the dispersible paper by transfer coat method with film thickness 0.5-0.8 mills. A film was dried at 90° C. for 2 min and conditioned overnight at 22° C.+/−2° C. and 50%+/−5% humidity. 5×1 in label applied to stainless steel testing plate with for 24 hours. Wash off in standard sink with room temperature water. Must wash off in 90 seconds. Check SS for tacky residue or ghosting. Rank a cleanness of the plate between 0 and 5 (0-clean).

Wash Off Adhesive's Residual HDPE Test:

An adhesive was applied to the dispersible paper by transfer coat method with film thickness 0.5-0.8 mills. A film was dried at 90 C for 2 min and conditioned overnight at 22° C.+/−2° C. and 50%+/−5 C humidity. 5×1 in label applied to HDPE testing plate with for 24 hours. wash off in standard sink with room temperature water. Must wash off in 90 seconds. Check HDPE for tacky residue or ghosting. Rank a cleanness of the plate between 0 and 5 (0-clean).

Example 2: Polymer Preparation

The reaction was performed in the same manner of Example 1 with following reagents with respective weights (specified in parenthesis).

DI water (180 g), sodium citrate (0.5 g), sodium EDTA (0.7 g), Aerosol A-102 (0.5 g), Pluronic L-121 (0.5 g) into the reactor and mixed for 10-15 minutes. Then vinyl acetate (10 g), butyl acrylate (10 g) and acrylic acid (0.3 g) were then added to the reactor under mixing.

A pre-emulsion was made by adding DI water (260 g), sodium citrate (1.5 g), Aerosol A-102 (40 g), Pluronic, L-121 (14 g), Reasoap SR-1025 (16 g) into 1 L container and mixing for 10-15 minutes. Then beta-carboxylated acrylate (12.25 g), 2-hydroxypropyl acrylate (12.25 g), methyl methacrylate (30.72 g), vinyl acetate (68 g), dodecyl mercaptan (4.5 g), butyl acrylate (420.5 g) and acrylic acid (46 g) were charged into the same jar under agitation and mixed for 30 minutes at 500 rpm to form a uniform emulsion.

The t-butyl hydroperoxide initiator solution was prepared by mixing water (81.98 g) with t-butyl hydroperoxide (4.34 g). The activator solution was prepared by mixing of water (57.97 g) with Bruggolite FF6 (3.06 g). The reactor was heated up to 68° C. t-butyl hydroperoxide (1.99 g) solution and Bruggolite FF6 (2.07 g) solution was charged into the reactor simultaneously. After 8-10 min the seed formed.

The reactor temperature was set to 72° C. When the temperature reached 72° C., the pre-emulsion, 71.6 g initiator solution and 50 g of activator solution were charged into reactor over 240 minutes. An exothermic polymerization reaction was taken place after a short induction period. When the polymerization completed, Bruggolite FF6 (8.96 g) solution and t-butyl hydroperoxide (12.73 g) solutions were added into reactor over 60 minutes at 55° C. to reduce unreacted monomers.

The reactor temperature cooled down to 30° C. and biocide Kathon LX solution (7.5 g water/0.27 g Kathon-LX) was added. The base polymer was filtered through the cheesecloth and packed. The measured particle size of the polymer was 314 nm.

Then the polymer was blended into the final product (Table 4) with following ingredients of specific weight:

TABLE 4

| Product Formulation | |
|---|---|
| Product | Amount |
| Polymer | 200 g |
| Defoamer DeeFo-215 | 0.3 g |
| Wetting agent Dapro W-95HS | 1.4 g |
| Ammonia Hydroxide | 1.0 g |
| Thickener Rheolate-278 | 0.8 g |

The blend was coated into dissoluble paper with the film thickness of 0.8-0.9 mils.

Dispersibility test: Dispersibility test was performed and the coated sample dispersed after immersing into water (rating: 4).

Example 11

Mw—average molecular weight; Mn represents the lengths of the polymer chain; Mp—molecular weight of the highest peak of the polymers were measured (Table 5).

TABLE 5

| | Examples | | | |
|---|---|---|---|---|
| | Mn | Mw | Mp | Label Dispersibility |
| Example #1 | 22,590 | 1,604,800 | 73136 | 2 |
| Example #2 | 8158 | 116,000 | 54644 | 4 |
| Example #11 | 17223 | 248,700 | 70088 | 5 |

A method of bonding a label to a substrate with the adhesive composition of this invention is as follows: the adhesive composition was applied to a release liner at 1 mil adhesive thickness and dried in an oven for 2 minutes at 90° C. Then, the adhesive was transferred to a dispersible paper passing through laminator. A 2"×3" label was applied to stainless steel or high-density polypropylene testing plates with an even pressure using a handheld roller.

TABLE 6

| Impact of the amount (Table 6) of post added nonionic surfactant to the polymer of Example 11 on label dispersibility: | | |
|---|---|---|
| Ingredient, wet % | 1% | 2% |
| Rhodafac ON-877 | 4 | 3 |
| Pluronic L-121 | 4 | 4 |
| Pluronic 35 | 2 | 2 |

While this invention has been described in detail with reference to certain preferred embodiments, it should be appreciated that the present disclosure is not limited to those precise embodiments. Rather, in view of the present disclosure, many modifications and variations would present themselves to those skilled in the art without departing from the scope and spirit of this invention.

What is claimed is:

1. An emulsion comprising:
a plurality of multiphase polymer particles comprising an acrylic-based copolymer derived from monomers comprising:
i. at least one alkyl methacrylate;
ii. at least one alkyl acrylate;
iii. at least one hydroxyalkyl acrylate or hydroxyalkyl methacrylate;
iv. at least one acid;
v. at least one carboxyalkyl (meth)acrylate;
vi. at least one vinyl ester; and
vii. at least one copolymerizable surfactant.

2. The emulsion according to claim 1, wherein the plurality of multiphase polymer particles has an average particle size of from about 100 nm to about 600 nm.

3. The emulsion according to claim 1, wherein the acrylic-based copolymer has a glass transition temperature (Tg) of from about −55° C. to about +70° C.

4. The emulsion according to claim 1, wherein the acrylic-based copolymer has a molecular weight (Mw) of from about 30,000 units to about 500,000 units.

5. The emulsion according to claim 1, wherein the alkyl methacrylate has about 1 to about 20 carbon atoms in the alkyl group.

6. The emulsion according to claim 5, wherein the alkyl methacrylate is selected from the group consisting of ethyl methacrylate, ethyl methacrylate, 2-ethylhexyl methacrylate, n-butyl methacrylate, sec-butyl methacrylate, tert-butyl methacrylate, dodecyl methacrylate, and combinations thereof.

7. The emulsion according to claim 1, wherein the alkyl acrylate has about 1 to about 20 carbon atoms in the alkyl group.

8. The emulsion according to claim 7, wherein the alkyl acrylate is selected from the group consisting of n-butyl acrylate, sec-butyl acrylate, tert-butyl acrylate, 2-ethylhexyl acrylate, ethyl acrylate, iso-octyl acrylate, decyl acrylate, hexyl acrylate, and combinations thereof.

9. The emulsion according to claim 1, wherein the hydroxyalkyl acrylate or hydroxyalkyl methacrylate is selected from the group consisting of hydroxyethyl acrylate, hydroxyethyl methacrylate, hydroxypropyl acrylate, hydroxypropyl methacrylate, 4-hydroxybutyl acrylate, 4-hydroxybutyl methacrylate and combinations thereof.

10. The emulsion according to claim 1, wherein the acid is selected from the group consisting of acrylic acid, methacrylic acid, itaconic acid, dimethacrylic acid, maleic acid, fumaric acid and combinations thereof.

11. The emulsion according to claim 1, wherein the carboxyalkyl (meth)acrylate monomer is selected from the group consisting of β-carboxyethyl acrylate (β-CEA), poly (2-carboxyethyl) acrylate, 2-carboxyethyl methacrylate, and combinations thereof.

12. The emulsion according to claim 1, wherein the vinyl ester is selected from the group consisting of vinyl acetate, vinyl propionate, vinyl butyrate, vinyl iso-butyrate, vinyl valerate, vinyl versatile, and combinations thereof.

13. The emulsion according to claim 1, wherein the copolymerizable surfactant has a structure represented by formula (I):

(I)

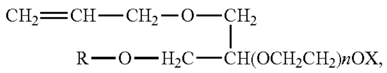

wherein R is $C_9$-$C_{15}$ alkyl or $C_7$-$C_{11}$ alkyl-phenyl; X is H, $SO_3NH_4$, or $SO_3Na$; and n is 3 to 50.

14. The emulsion according to claim 1, wherein the plurality of multiphase polymer particles comprises an acrylic-based copolymer derived from monomers comprising:
i. from about 20 to about 60% by weight of at least one alkyl methacrylate,
ii. from about 20 to about 80% by weight of at least one alkyl acrylate,
iii. from about 0.05 to about 10% by weight of at least one hydroxyalkyl acrylate or hydroxyalkyl methacrylate,
iv. from about 0.3 to about 3% by weight of at least one acid,
v. from about 0.5 to about 15% by weight of at least one carboxyalkyl (meth)acrylate,
vi. from about 0.5 to about 10% by weight of at least one vinyl ester, and
vii. from about 0.01 to about 15% by weight of at least one copolymerizable surfactant.

15. The emulsion according to claim 1, further comprising one or more additive selected from the group consisting of a chain transfer agent, a cross-linking agent, a surfactant, a free-radical initiator, a buffer and combinations thereof.

16. An emulsion, comprising:
i. a plurality of multiphase polymer particles comprising an acrylic-based copolymer of claim 1,
ii. at least one alkylphenol ethoxylate (APE) free nonionic surfactant, and iii. at least one APE free anionic surfactant in an aqueous medium in presence of a free-radical initiator and a buffer.

17. The emulsion according to claim 16, wherein the alkylphenol ethoxylate (APE) free nonionic surfactant is selected from the group consisting of polyoxyethylene aliphatic ether, polyoxyethylene alkaryl ether, polyoxyethylene esters of higher fatty acid, condensates of ethylene oxide with resin acid and tall oil acid, polyoxyethylene amide and amine condensate, and polyoxyethylene thio-ether and combinations thereof.

18. The emulsion according to claim 17, wherein the alkylphenol ethoxylate (APE) free nonionic surfactant comprises:

i. a polyoxyethylene aliphatic ether which is polyoxyethylene lauryl ether or polyoxyethylene oleyl ether, ii. a polyoxyethylene alkaryl ether which is polyoxyethylene nonylphenol ether or polyoxyethylene octylphenol ether, iii. a polyoxyethylene ester of higher fatty acid which is polyoxyethylene laurate or polyoxyethylene oleate, iv. a polyoxyethylene amide and amine condensate which is N-polyoxyethylene lauramide or N-lauryl-N-polyoxyethylene amine, and v. a polyoxyethylene thio-ether which is polyoxyethylene n-dodecyl thio-ether, and combinations thereof.

19. The emulsion according to claim 16, wherein the alkylphenol ethoxylate (APE) free anionic surfactant is selected from the group consisting of sodium lauryl ether sulfate, sodium lauryl ethoxylate, sodium tridecyl ether sulfate, sodium salt of linear sulfated alcohol ethoxylate, sodium alpha olefin sulphonate, sodium dodecylbenzene sulphonate, disodium alkyl diphenyloxide sulphonate, sodium dioctyl sulfosuccinate, sodium lauryl ether sulfate, alkyldiphenyloxide disulphonate disodium salt and combinations thereof.

20. The emulsion according to claim 16, wherein the free-radical initiator is selected from the group consisting of sodium persulfate, ammonium persulfate, potassium persulfate, sodium formaldehyde-sulfoxylate, zinc formaldehyde-sulphoxylate, disodium salts of 2-hydroxy-2-sufinatoacetic acid and 2-hydroxy-2-sufonatoacetic acid, hydrogen peroxide and tert-butyl hydroperoxide (t-BHP); azo compounds and combinations thereof.

21. The emulsion according to claim 16, wherein the buffer is selected from the group consisting of disodium pyrophosphate, sodium citrate, sodium bicarbonate, sodium carbonate and combinations thereof.

22. A method of preparing the multiphase polymer emulsion of claim 1, by free radical emulsion polymerization comprising:

i. charging the monomers of claim 1, at least one emulsifier and water to a reactor, ii. heating the reactor to a temperature of at least about 75° C., and iii. isolating said polymer.

23. A method of preparing the multiphase polymer emulsion of claim 22, by free radical emulsion polymerization comprising:

i. charging a reactor with monomers comprising:

a. from about 20 to about 60% by weight of at least one alkyl methacrylate, b. from about 20 to about 80% by weight of at least one alkyl acrylate, c. from about 0.05 to about 10% by weight of at least one hydroxyalkyl acrylate or hydroxyalkyl methacrylate, d. from about 0.3 to about 3% by weight of at least one acid, e. from about 0.5 to about 15% by weight of at least one carboxyalkyl (meth)acrylate, f. from about 0.5 to about 10% by weight of at least one vinyl ester, g. from about 0.01 to about 15% by weight of at least one co-polymerizable surfactant, h. from about 0.01 to about 15% by weight of at least one anionic emulsifier, i. water, and j. one or more additive, ii. heating the reactor to a temperature of at least about 75° C.; and iii. isolating said polymer.

24. A water-dispersible pressure sensitive adhesive composition comprising:

i. a plurality of multiphase polymer particles comprising an acrylic-based copolymer derived from monomers of claim 1, and ii. one or more additive.

25. The water-dispersible pressure sensitive adhesive composition according to claim 24, wherein the water-dispersible pressure sensitive adhesive has a pH from about 4 to about 5.5.

26. A method of bonding a label to a container with the water-dispersible pressure sensitive adhesive composition of claim 23, comprising applying said composition to said label and thereafter applying said label with pressure to said container such that the adhesive is in contact with the container.

* * * * *